(12) United States Patent
Martin et al.

(10) Patent No.: US 8,576,068 B2
(45) Date of Patent: Nov. 5, 2013

(54) METHOD AND SYSTEM FOR UPLOADING NEAR-REAL-TIME MESSAGES TO KEYPAD OF A SECURITY SYSTEM

(75) Inventors: Christopher D. Martin, Plainview, NY (US); William R. Blum, Huntington Station, NY (US); Scott Simon, Huntington Station, NY (US)

(73) Assignee: Honeywell International Inc., Morristown, NJ (US)

( * ) Notice: Subject to any disclaimer, the term of this patent is extended or adjusted under 35 U.S.C. 154(b) by 1465 days.

(21) Appl. No.: 11/647,919

(22) Filed: Dec. 29, 2006

(65) Prior Publication Data

US 2008/0157963 A1   Jul. 3, 2008

(51) Int. Cl.
*G08B 1/08* (2006.01)

(52) U.S. Cl.
USPC .................................. 340/539.17; 340/539.16

(58) Field of Classification Search
USPC ............. 340/539.14, 539.16, 539.17, 539.18, 340/539.1
See application file for complete search history.

(56) References Cited

U.S. PATENT DOCUMENTS

| | | | | |
|---|---|---|---|---|
| 4,644,351 A | * | 2/1987 | Zabarsky et al. ............. | 340/7.21 |
| 4,721,954 A | * | 1/1988 | Mauch ........................... | 340/5.54 |
| 5,131,020 A | | 7/1992 | Liebesny et al. | |
| 5,398,021 A | * | 3/1995 | Moore ........................... | 340/7.48 |
| 6,085,100 A | * | 7/2000 | Tarnanen ....................... | 455/466 |
| 6,112,074 A | | 8/2000 | Pinder | |
| 6,177,873 B1 | * | 1/2001 | Cragun ........................... | 340/601 |
| 6,208,932 B1 | * | 3/2001 | Ohmura et al. ............... | 701/538 |
| 6,437,692 B1 | * | 8/2002 | Petite et al. .................... | 340/540 |
| 6,509,833 B2 | * | 1/2003 | Tate ........................... | 340/539.1 |
| 6,847,892 B2 | * | 1/2005 | Zhou et al. ..................... | 701/408 |
| 6,879,847 B1 | * | 4/2005 | Kato et al. ..................... | 455/566 |
| 6,914,525 B2 | * | 7/2005 | Rao et al. ...................... | 340/531 |
| 6,928,148 B2 | | 8/2005 | Simon et al. | |
| 6,965,313 B1 | * | 11/2005 | Saylor et al. ............. | 340/539.18 |
| 7,042,350 B2 | | 5/2006 | Patrick et al. | |
| 7,123,138 B1 | * | 10/2006 | Infosino ........................ | 340/506 |
| 7,123,142 B2 | * | 10/2006 | Bohbot et al. ........... | 340/539.14 |
| 7,180,415 B2 | * | 2/2007 | Bankert et al. ........... | 340/539.17 |
| 7,251,478 B2 | * | 7/2007 | Cortegiano ................ | 455/412.1 |
| 7,301,450 B2 | * | 11/2007 | Carrino .................... | 340/539.11 |
| 7,348,895 B2 | * | 3/2008 | Lagassey ...................... | 340/907 |
| 7,418,087 B2 | * | 8/2008 | Luneau et al. ............. | 379/88.21 |
| 8,050,281 B2 | * | 11/2011 | Casey et al. .................... | 370/401 |
| 2001/0022558 A1 | * | 9/2001 | Karr et al. ..................... | 342/450 |

(Continued)

OTHER PUBLICATIONS 8142-i User Guide, Honeywell, ADEMCO, k5763v3, 12/02 Rev. B., pp. 1-79.

(Continued)

*Primary Examiner* — Travis Hunnings
*Assistant Examiner* — Rufus Point
(74) *Attorney, Agent, or Firm* — Husch Blackwell

(57) ABSTRACT

A method and system for automatically displayed data on a keypad display of a security system. The system receives the data from an external database, determines whether the data is to be displayed based upon at least one display criterion, formats the data for displaying on the keypad display in a format compatible with the keypad display and displays the data in the format compatible with the keypad display. The system actively polls a third party source for the data and stores the data in the external database. The determination whether the data is to be displayed be can performed at the local security system or a central network operation center.

31 Claims, 6 Drawing Sheets

(56) References Cited

U.S. PATENT DOCUMENTS

| | | |
|---|---|---|
| 2002/0037722 A1 | 3/2002 | Hussain et al. |
| 2003/0006911 A1* | 1/2003 | Smith et al. .................. 340/988 |
| 2003/0101150 A1 | 5/2003 | Agnihotri et al. |
| 2005/0027741 A1* | 2/2005 | Eichstaedt et al. ......... 707/104.1 |
| 2005/0242944 A1 | 11/2005 | Bankert et al. |
| 2006/0095199 A1* | 5/2006 | Lagassey .................... 701/117 |
| 2007/0149214 A1* | 6/2007 | Walsh et al. ............... 455/456.1 |
| 2007/0222559 A1* | 9/2007 | Nickens et al. ............... 340/7.1 |
| 2008/0157963 A1* | 7/2008 | Martin et al. ................. 340/541 |

OTHER PUBLICATIONS

European Search Report, mailed Nov. 16, 2009 corresponding to European application No. EP 07 12 4140.

* cited by examiner

METHOD AND SYSTEM FOR UPLOADING NEAR-REAL-TIME MESSAGES TO KEYPAD OF A SECURITY SYSTEM

BACKGROUND OF THE INVENTION

1. Field of the Invention

This invention relates to a communications system. More particularly, the invention relates to a method and system for uploading information from a third party source to a keypad of a security system.

2. Background

Security systems, such as for both commercial and residential use, have become commonplace as people seek to protect themselves and their property. A security system includes any life, safety, and property protection system. A typical security system includes a security device located at the commercial or residential property (hereinafter "local security system"), a local monitoring station and a network operation center or a central communication station. Security systems of the type being discussed almost universally communicate with a "network operation center" and/or a "central monitoring station" which monitors or supervises the status of each security system. Not only are alarms reported to the central station, which then acts on them or dispatches law enforcement to act on them, but even the absence of communication may be acted upon as a sign of possible trouble at the secured premises.

The local security system includes a user interface device such as a keypad with alphanumeric keys. This keypad can be wired or wireless.

Typically, information is transmitted from a central communication center or network operation center to a control panel for the local security system using a communications network. The control panel relays the information to the keypad using a communications bus or via a wireless antenna.

Alternatively, some keypads can have their own transmission and reception sections to transmit and receive information. For example, Honeywell International, Inc., has developed a graphic keypad that has an Internet connection built-in, e.g. Symphony 8132/8132i. This allows for the transmission of information to and from the keypad via the Internet. The keypad can be used to surf the world wide web or send e-mails. However, the user must actively use the keypad to access the Internet and information on the Internet.

There is a need for certain information to be automatically displayed to a user without the need for a user to initiate a request. For example, it would be desirable to be able to indicate or display emergency information such as weather alerts or local amber alerts and other real-time data in near real-time without any user initiation.

BRIEF SUMMARY OF THE INVENTION

Accordingly, disclosed is a method and system that allows a network operation center to upload certain near real-time data to a keypad of a security system without a specific contemporaneous request from a user.

The method includes the steps of receiving the near real-time data from at least one third party source, storing the near real-time data in a database, determining at least one subscriber to send the near real-time data based upon at least one determination parameter and transmitting the near real-time data to the security system corresponding to the at least one subscriber. The method also includes a step of polling each third party source for updates to the data. The data is sorted and stored based upon the third party source. The near real-time data includes amber alerts. Additionally, the near real-time data includes weather alerts.

The method further includes a step of configuring either the control panel or network operation center to perform the method. The configuration includes inputting the at least one third party source into a database for polling.

The method further includes converting the received data into a format compatible with the security system.

The determination parameter can be a location of the security system such as the state, area code or zip code. If the determination parameter is a location, the method further includes the step of determining if the security system is located within a preset limited location. Alternatively, the determination parameter can be a type of near real-time data.

The near real-time data can be transmitted to a control panel located within a premises having the security system. The control panel will then forward the near real-time data to at least one keypad. Alternatively, the near real-time data can be transmitted directly to at least one keypad located within a premises having the security system.

The method further includes displaying the near real-time data on at least one keypad located within a premises having the security system. When the near real-time data is displayed on the keypad, an occupant is notified of the display. The notification can include an audible sound or voice indicating the reception of the near real-time data. Additionally, the notification can include a visible indication of the reception of the near real-time data.

Further disclosed is a method of displayed data on at least one keypad display. The method includes receiving the data from an external database, determining whether the data is to be displayed based upon at least one display criterion, formatting the data for displaying on the keypad display in a format compatible with the keypad display and displaying the data in the format compatible with the keypad display.

The method further includes polling the at least one third party source at a preset interval. The preset interval is variable based on the type data. Additionally, the preset interval is variable based on the at least one third party source.

The method further includes determining a status of a local security system that corresponds to the at least one keypad. The data is displayed based upon the determination for the status of the local security system. If the status of the local security system is armed-away, the data is stored in a database for display at a later time. The later time can be when the local security system is disarmed. Additionally, if the status of the local security system is armed-away, the data is transmitted to a registered alternate remote device.

Also disclosed is a communication system for automatically displaying near real-time data on a display of a security system keypad. The communication system comprises a polling agent which actively collects the near real-time data from at least one third party source, a database for storing the near real-time data indexed by the at least one third party source and a type of near real-time data, a control section for determining a location to send the near real-time data for displaying based upon preset parameters; a transmitter for transmitting the near real-time data to a security system keypad based upon the determination: and a display for displaying the near real-time data.

The system further includes a central database for storing subscriber information, which is used to determine a location to send the near real-time data. The control section can be located at a network operation center. Alternatively, the control section can be located at the security system. If the control section is located at the security system, the preset parameters are stored in a control panel at the security system.

BRIEF DESCRIPTION OF THE DRAWINGS

These and other features, benefits and advantages of the present invention will become apparent by reference to the following text and figures, with like reference numbers referring to like elements across the views, wherein.

The present invention includes a method and system for transmitting near real-time information to a local security system 120 for display on a keypad 540.

Figure 1:
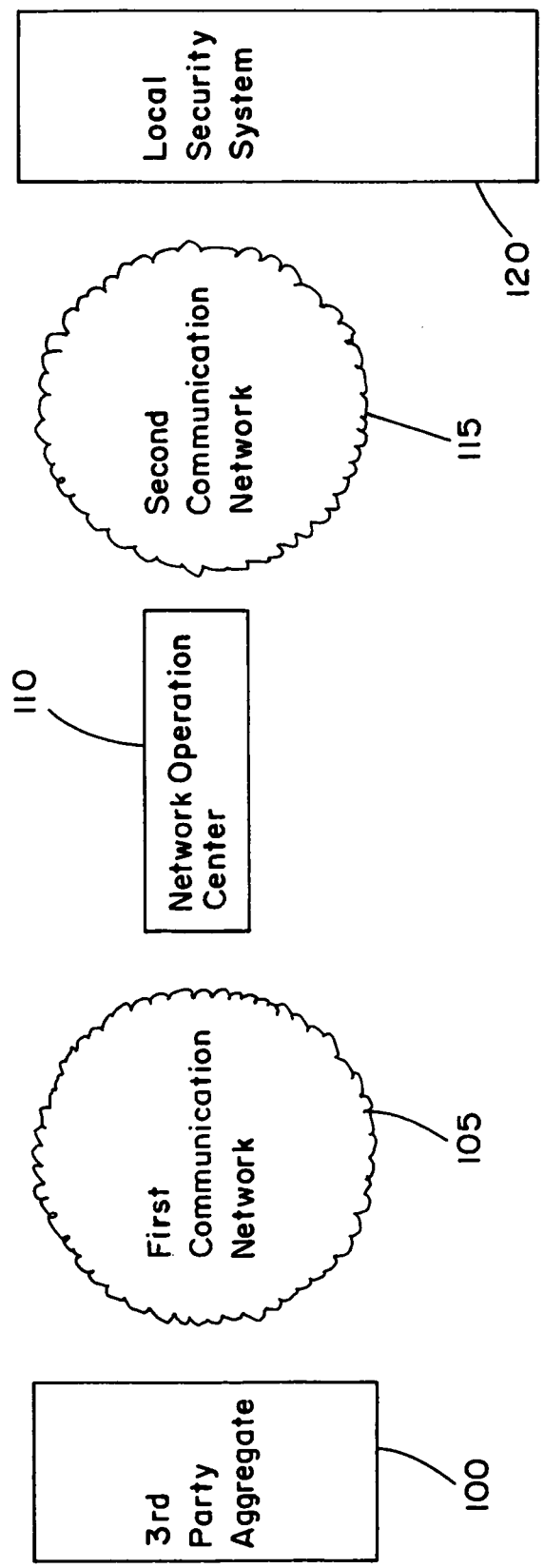
FIG. 1 is a diagram of the components of a system in accordance with an embodiment of the invention.

FIG. 1 illustrates a diagram of the system in accordance with the invention. According to the invention, the network operation center 110 (NOC) polls a third party aggregate 100 for near real-time data. The third party aggregate 100 can be any third party data source such as the national weather service, a government agency, the associated press, a stock exchange or other information service. The NOC 110 pulls the data from the third party aggregate 100, stores the data and pushes the data to a local security system 120 based upon at least one predetermined criterion. The third party aggregate 100 transmits the near real-time data using a first communication network 105. The first communication network 105 can be the Internet.

The NOC 110 receives the data, stores the data, formats the data and forwards the data to the local security system 120 using the second communication network 115. The second communication network can be any communication network capable of transmitting data between two devices, such as the Internet, cellular network (GSM), PSTN, etc.

Figure 2:
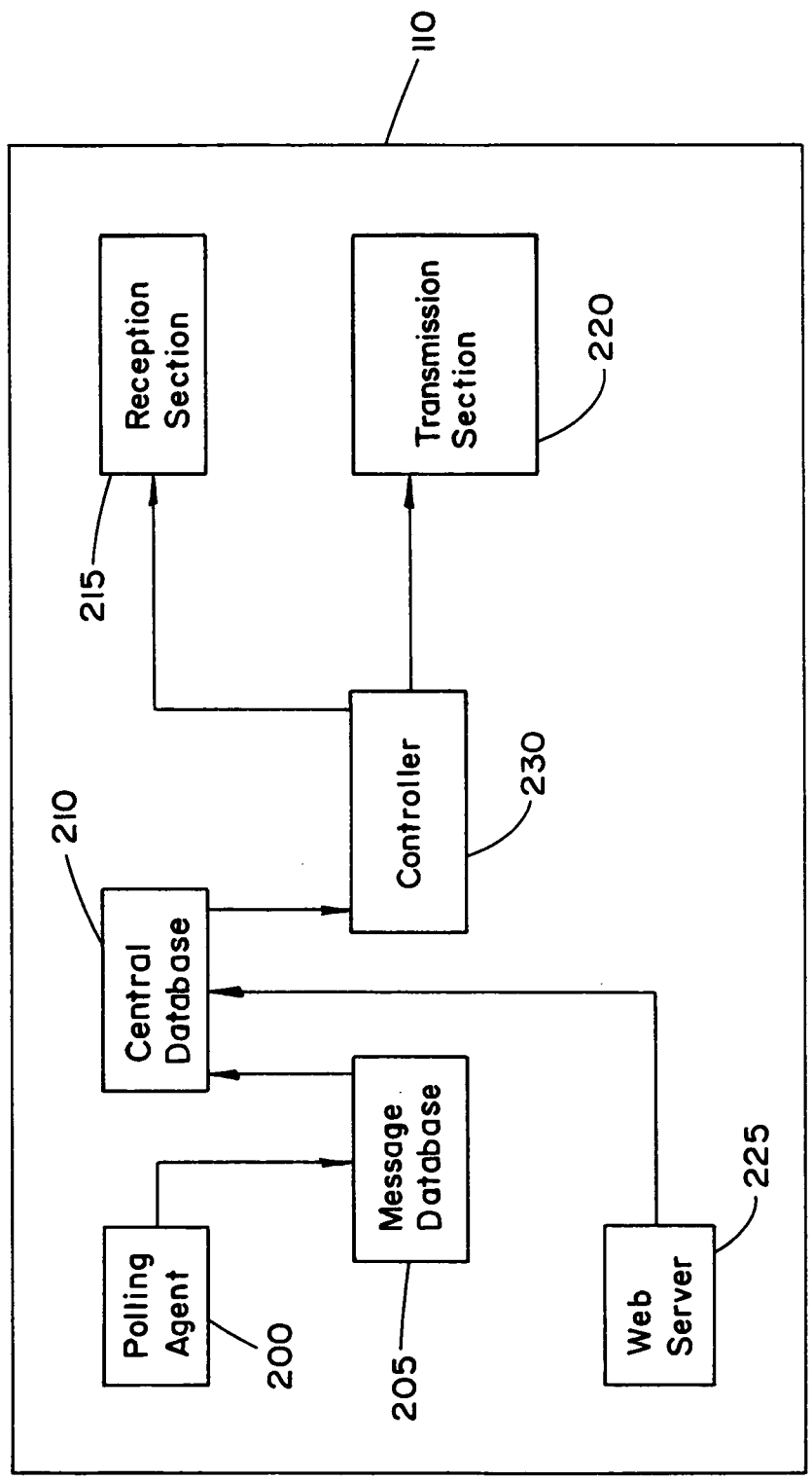
FIG. 2 illustrates a block diagram of the network operation center according to an embodiment of the invention.

FIG. 2 illustrates a block diagram of the network operation center 110 according to an embodiment of the invention.

The network operation center 110 includes a polling agent 200, a message database 205, a central database 210, a reception section 215, a transmission section 220, a web server 225 and a controller.

The polling agent 200 polls the third party aggregates 100 for updates in the near-real-time data such as stock quotes, sports score, weather reports, weather alerts, amber alerts, FBI reports, etc.

The polling agent 200 is programmed with a specific list of third party aggregates 100 to poll. This specific list or master list can be customized by an NOC operator. The master list will include at least a third party source name, i.e., National Weather Service and a polling location. The polling location is an address where the polling agent 200 will look for the near real-time information. This address can be a Universal resource locator (URL) or IP address. When registering for the near real-time update service, the subscriber will have access to the master list to select at least one third party source from all available sources to receive updates therefrom. The master list is stored in the message database 205. The master list can be periodically updated by a NOC operator to have current information regarding the third party source. Additionally, new third party sources can be added to the master list and old third party sources can be deleted or removed. For each third party source, the NOC operator can customize or select specific information for the polling agent 200 to collect during polling. For example, the polling agent 200 can collect only weather alerts from the National Weather Service. Alternatively, the polling agent 200 can collect weather alerts, temperature, and humidity percentages. Additionally, the master list will include a polling period for each third party source. In one embodiment, the polling agent 200 can continuously poll each third party aggregate 100 for data. In another embodiment, the polling agent 200 will poll a third party aggregate 100 after a predefined period of time has expired, e.g., 10 minute intervals. The predefined period of time is variable and each third party aggregate 100 can have a different predefined period of time. For example, the period of time for sports scores can be longer than the period of time for weather alerts or amber alerts.

The polling agent 200 receives all near real-time data and stores the data in a message database 205. Each near real-time data is stored in the message database 205 in a location corresponding to the third party source or third party aggregate 100. The near real-time data is kept in storage in the message database 205 for a preset period of time. After the preset period of time, the data is discarded. In one embodiment, the preset period of time will vary depending upon both the type of data and third party aggregate. For example, an amber alert can be kept in storage until the alert is no longer valid. An weather alert can be stored for a few days. However, the temperature might only be stored for a few hours. In another example, the local news from the Associated Press (AP) might be stored for several days.

The preset period of time can be customized by the NOC operator, programmed into the message database 205 and associated with both the third party source and the type of data.

Alternatively, the same period of time can be used for each third party source or type of data. Alternatively, a different period of time can be based on either the type of data or third party source.

In another embodiment, the near real-time can be kept in storage in the message database 205 until a new update is received for the same type of data. The older data will then be discarded. Only the most recent update will be kept. For example, every time a new weather alert or amber alert is received, the older alert is discarded.

The central database 210 includes all subscriber and user information including account numbers, telephone numbers, pass codes, unique identification information, authorized e-mail addresses . . . etc. The central database 210 also includes information related to which the subscriber has registered for receiving near-real-time data on their local security system 120 in accordance with this invention, such as type of data desired, any schedule associated with the type of data and any other limitations.

In another embodiment, data related to a schedule and other limitations on the near real-time data updated can be stored in a control panel 500 located at the local security system 100. Alternatively, the data can be stored in the keypad 540 itself.

The web server 225 provides host services for the host website that allows a subscriber to register for near real-time data updates on the local security system.

The controller 230 is programmed to control all features of the system including determining where each stored real-time data should be sent based upon data in the central database 210 and other predetermined criterion. The other predetermined criterion can be the location of each local security system 120. For example, a zip code, area code or state in which the local security system can be used to limit the transmission of the near real-time data to a specific area. According to this embodiment, near real-time data such as weather alerts can be limited to the relevant area.

Figure 3:
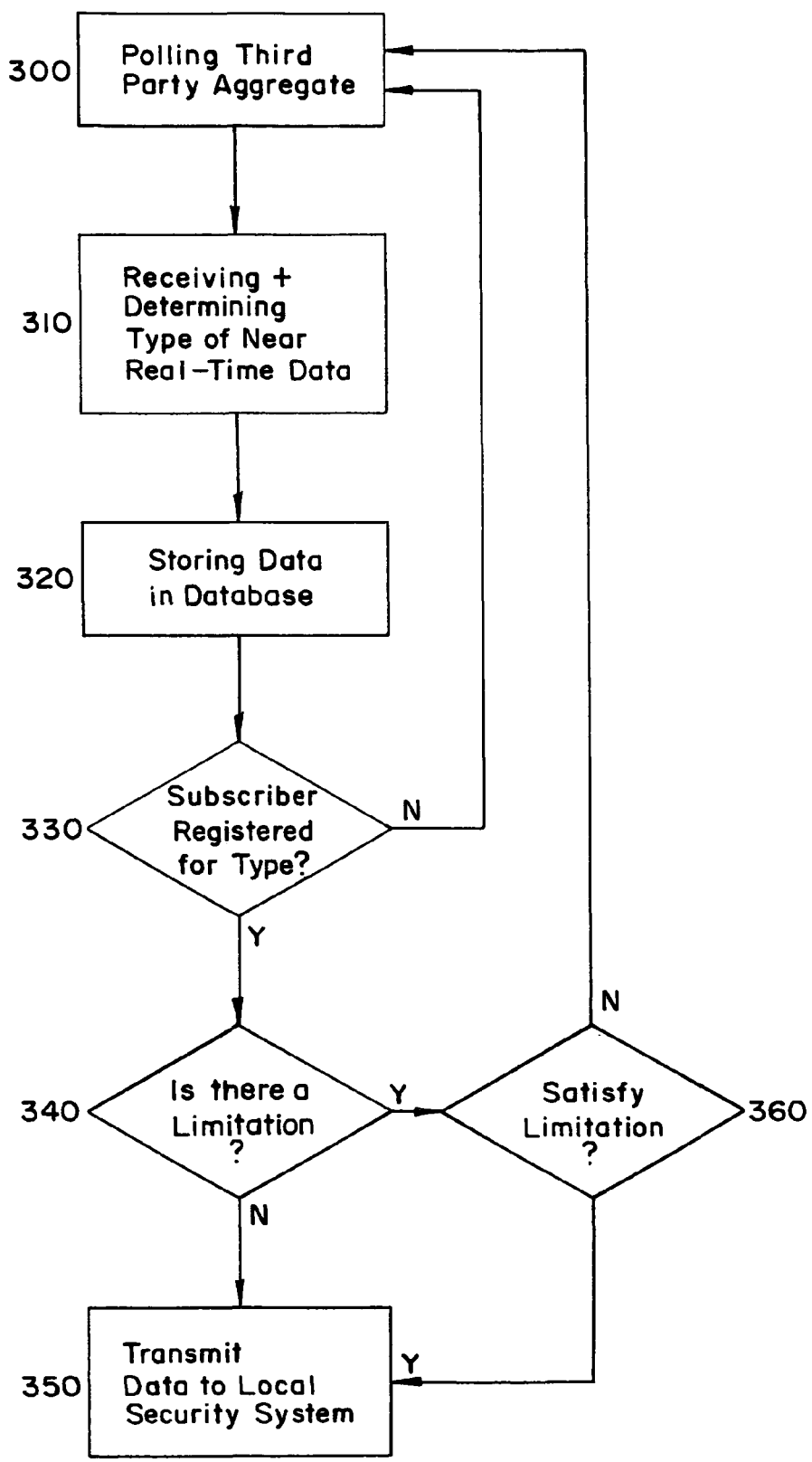
FIGS. 3 and 4 illustrate a flow chart for the method of providing near real-time data on a keypad in accordance with an embodiment of the invention.
Figure 4:
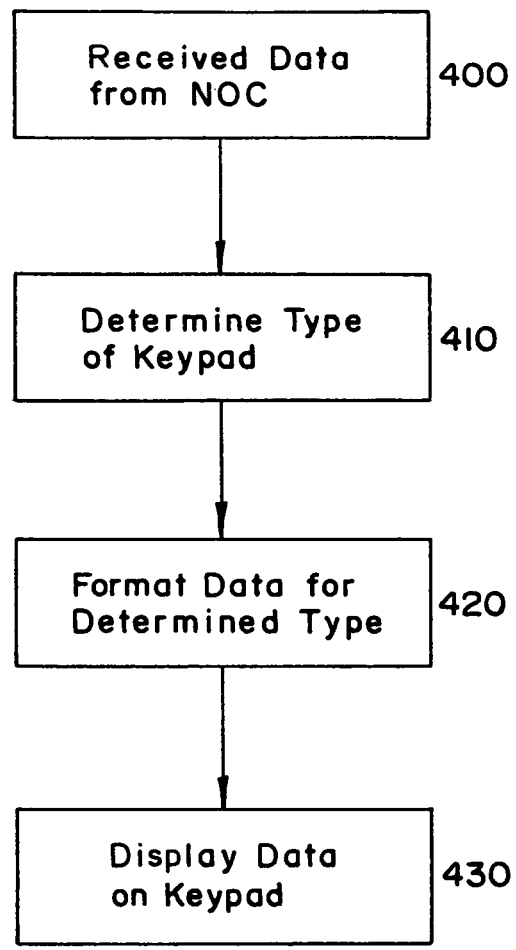

FIGS. 3 and 4 illustrate flow charts for the method according to the first embodiment of the invention.

At step 300, the polling agent 200 polls each preset third party aggregate 100 for the near-real-time data. For example, the polling agent 200 will poll the national weather service for any weather alerts.

At step 310, the NOC 110 receives the near real-time data from the third party aggregate 100 and determines the type of near real-time data.

This determination is based upon the address of the source. The near real-time data is stored in the message database 205 and indexed by third party aggregate 100 and type of data, at step 320.

At step 330, the controller 230 determines if any subscriber has pre-registered to receive the determined type of near real-time data. The controller 230 searches subscriber information in the central database 210 for any subscribers that have a subscriber record that includes information related to the determined near real-time data. The controller 230 will extract all subscriber records that include information related to the determined near real-time-data. If there are no subscriber records requesting updated or information related to the determined type near real-time data, the process returns to step 300.

If there is at least one subscriber record that includes information related to a request for the determined type of near real-time data, for each extracted subscriber record, the controller 230 will then determine if there is any limitation associated with the subscriber record or determined type of near real-time data, at step 340. A limitation can be a time period or a location of the corresponding local security system 120.

If no limitations exist, then the controller 230 will cause the transmission section 220 to transmit the near real-time data to the local security system 120 corresponding to the subscriber records, at step 350.

If there is a limitation associated with the type of data or with a subscriber record, then for each record the controller will examine the limitation to determine whether to transmit the near real-time data to the corresponding local security system 120, at step 360. For example, if there is a location limitation associated with the determined type of data, the controller 230 will determine if the corresponding local security system associated with each selected record is within the limited location. If a corresponding local security system associated with each selected record is within the limited location, the controller 230 will cause the transmission section 220 to transmit the near real-time data to the local security system 120. If the corresponding local security system associated with each selected record is not within the limited location, the controller will not transmit the data and the process will return to step 300. As stated above, the limited location can be a zip code, an area code, a state or a set region.

Alternatively, a subscriber might have preset a temporal limitation for the determined type of data. For example, the subscriber might not want to receive information regarding a particular near real-time data at night. The controller 230 would execute a similar determination for the temporal limitation as performed with respect to the location limitation.

At step 400, in FIG. 4, the local security system 120 will receive the near real-time data from the NOC 110 via the second communication network 115.

In one embodiment, the control panel 500 will receive the data and forward the data to a keypad 540. Alternatively, in another embodiment, the keypad 540 will receive the data directly from the NOC 110.

There are several different types of keypads 540 that are currently available, such a text only or graphic keypad 540. At step 410, the type of keypad 540 is determined such that the data can be formatted properly.

In one embodiment, the control panel 500 performs this determination based upon programmed information in memory. Alternatively, the keypad 540 performs the determination.

Once a determination is made, the data is formatted to be compatible with the type of keypad 540, at step 420. For example, if the keypad 540 is a graphic keypad 540, the near real-time data will be in a graphic format such as Basic HTML. Alternatively, if the keypad 540 only displays texts, the near real-time data will be formatted as text.

At step 430, the near real-time data is displayed on the keypad 540 for viewing. Additionally, in an embodiment of the invention, the keypad 540 will indicate that a new near real-time data has been received. The indication will be in the form of a visual or audible notification.

An audible notification can include a tone. A visual notification can include a flashing display or a light on a LED or voice announcement.

Figure 5:
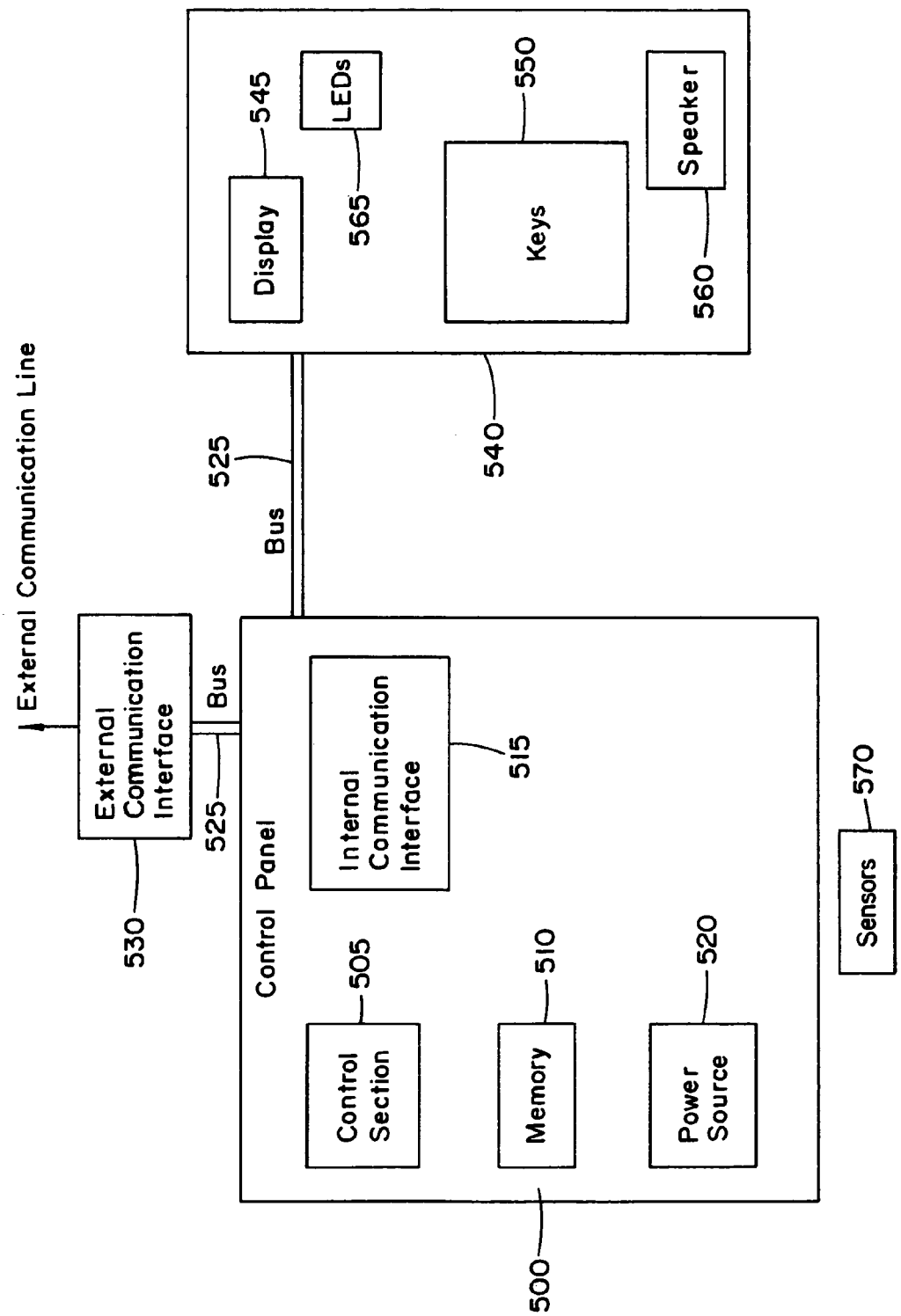
FIG. 5 illustrates a block diagram of an example local security system.

FIG. 5 illustrates a block diagram of an example of a local security system 120. As depicted, a local security system 120 includes a control panel 500, a keypad 540 and sensors 570. The control panel 500 acts as a hub or the brain for controlling the local security system 120. The control panel 500 is connected to an external communication interface 530 which interfaces with the external communication line. The communications interface 530 can be a telephone interface. Alternatively, the communications interface 530 can be an external data network/Internet interface, which may be a router or ADSL (asymmetric digital subscriber loop) interface, which provides continual access to the Internet over the external communication line. The Communication Interface also can be a modem. The control panel 500 can include an internal communication interface 515 that communicates with the external communication interface 530 via a communications bus 525. The control panel 500 also includes a power source 520 capable of powering at least the control panel 500. Additionally, the power source 520 can power the external communication interfaces. The power source can include an internal battery.

The control panel 500 also includes a memory 510. The memory 510 can be any storage device capable of storing information. The memory stores information relating to configuration information for the local security system 120, status of the local security system 120, events or alarms that are reported, and information received from the NOC 110 and/or a central monitoring station. The sensors 570 are in communication with the control panel 500 either through a wired communication bus 525 or a wireless transceiver (not illustrated) such as an RF receiver. The control section 505 processes signals from the sensors 570 according to configuration information stored in memory 510.

The keypad 540 can be directly connected to the controller via a communications bus 525, in which the communication functions are routed between the keypad 540 and the external communication interface 530 through the control panel 500. Alternatively, the keypad 540 can be a wireless keypad 540 with a radio transceiver that wirelessly communicates with the control panel 500.

The keypad 540 includes keys 550, a speaker 560 and a display 545. The display 545 can be a text display. Alternatively, the display can be a graphics display such as a liquid crystal display, gas plasma or cathode ray tube. The keys 550 can be a numeric keypad 540 or alphanumeric keypad 540. The speaker 560 is used to notify a person within the premises of an event such as the receipt of near real-time data in accordance with the invention.

The keypad 540 can also include a plurality of LEDs 565 or other light source which also serves as a way to notify a person within a premises. The keypad can also include a memory for storing data that the input data from the keypad 540. A network communications interface can also be included in the keypad 540.

As described above, the near real-time data will be transmitted to the local security system 120 using a second Communication Network 115. In one embodiment, the second communication network is the Internet. The Internet connection between the local security system 120 and the NOC 110 can be used for reliable secure communications.

In one embodiment, prior to transmission of the near real-time data, the transmission section 220 will encrypt the data. In another embodiment, the near-real-time data can be sent without being encrypted.

If the second Communication Network 115 is the Internet, in order to avoid a firewall, the NOC 110 will wait for the local security system 120 to initiate contact with the NOC 110 periodically. Once a session is open, the NOC 110 will send the data to the local security system 120. For example, the NOC 110 can use an AlarmNet-I communications network to transmit the encrypted instruction data. AlarmNet-I is a proprietary communication network operated by Honeywell, which uses the Internet. The network is used to upload and download alarm system configurations and operational data. In this example, the transmission section 220 in the NOC 110 will be an AlarmNet-I transmitter to the Internet and received by an AlarmNet-I receiver at the local security system 120. Alternatively, the NOC 110 can use an Ethernet-based transmitter to send the data over the Internet. Another alternative is that the NOC 110 can use a modem device as the transmission section 220 to transmit the instruction over the Internet.

For example, the NOC 110 can communicate with the local security system in a manner as depicted in FIG. 8 of U.S. Pat. No. 6,928,148, assigned to Pittway Corporation, which is hereby incorporated by reference. As depicted in FIG. 8 of U.S. Pat. No. 6,928,148, the NOC 110 is a central communication station.

In another embodiment, the NOC 110 can transmit the near real-time data to the local security system 120 using a cellular network. For example, the NOC 110 can include as the transmission section 220, a cellular antenna, e.g., an AlarmNet C transmitter. AlarmNet-C (now AlarmNet-G for GSM) is a proprietary communication network operated by Honeywell International Inc. that uses cellular communication network carriers. The AlarmNet C transmitter will route the instruction using the AlarmNet-C communication network.

In another embodiment, the NOC 110 can transmit the instruction to the local security system 120 using a standard telephone network using analog tones, frequency-shift keying or other tone patterns.

As described above, a subscriber can register or "opt in" to receive near real-time data at one or more keypads 540 located at a local security system 120 using a website maintained and managed by a web server 225 in the NOC 110. Using the website, a subscriber can activate the near real-time data feature for the local security system 120. In one embodiment, the subscriber will create a sub-record that will be associated with the subscriber record that includes all information related to the near real-time data feature. In another embodiment, information related to the near real-time data feature will be directly stored in the subscriber record. This pre-stored information in the subscriber record or sub-record will be accessed by the controller 230 each time a new near real-time data is received by the NOC 110 and stored in the message database 205. The information related to the near real-time data feature is input using a computer or any device that is capable of connecting to the Internet using a standard web browser. The subscriber logs into the website using a passcode and login name provided by a security system installer. The website is exposed to the Internet via a public IP address. Information entered onto the website is received by the web server 225 and stored as a data record in the central database 220.

The subscriber will enter the personal subscriber information into each field entry. The personal subscriber information can include a name, billing address, accounting number, and the address of the protected premises. To activate the near real-time data feature, the subscriber will select at least a type of near real-time data which the subscriber wishes to receive updates on at least one keypad 540.

As stated above, the master list of third party aggregates 100 or sources and available types of near real-time data is available to the subscriber during the registration process. The subscriber can select the third party aggregate and/or type of near real-time data. For example, if the subscriber waits to receive weather updates from the National Weather Service, the subscriber can select the National Weather Service from the master list or select each individual type of near real-time data, e.g. temperature, humidity, alerts, etc.

If a subscriber has more than one keypad 540 installed at a local security system 120, the subscriber can select a particular keypad 540 in which the near real-time data will be displayed. For example, a subscriber can have a keypad 540 located in every room of a residence, yet only have the near real-time data displayed on a keypad 540 located near the entrance of the residence and in a master bedroom. This selection process can be made for each type of near real-time data. Alternatively, the subscriber can select a particular keypad 540 for all types of data.

If the subscriber does not specify keypad 540, the near real-time data will be displayed on the key pads 540 as a default.

Additionally, a subscriber can set a schedule for receiving each type of near real-time data. A subscriber can input a specific time period in which the subscriber does not want to receive a type of near real-time data, or alternatively specify a timer period in which the subscriber does want to receive a type of near real-time data. For example, a subscriber might not want to receive data related to sports updates and stock quotes after 10 PM and before 8 AM. The subscriber can input a limiting schedule for this type of near real-time data.

Once all of the desired information is entered into the website, the web server 225 will forward all of the information to the central database 220 for storage in the subscriber data record or sub-record.

In another embodiment, subscribers can use the keypad 540 themselves to input any information related to the near real-time data. The inputted information will be stored locally in the control panel 500. In this embodiment, the NOC 110 will only act as an intermediary between the third-party aggregate 100 and the local security system 120. All near real-time data will be transmitted from the NOC 110 to the local security system 120. The control panel 500 will perform steps 320-340 and 360 using the control section 505 based upon information received from the keypad 540 and stored in memory 510. If the subscriber pre-registered to receive data related to the received near real-time data, the control panel 500 will forward the data to a preset keypad 540.

In another embodiment prior to displaying the near real-time data, the NOC 110 determines the status of the local security system 110. The near real-time data is displayed based upon this determination.

Figure 6:
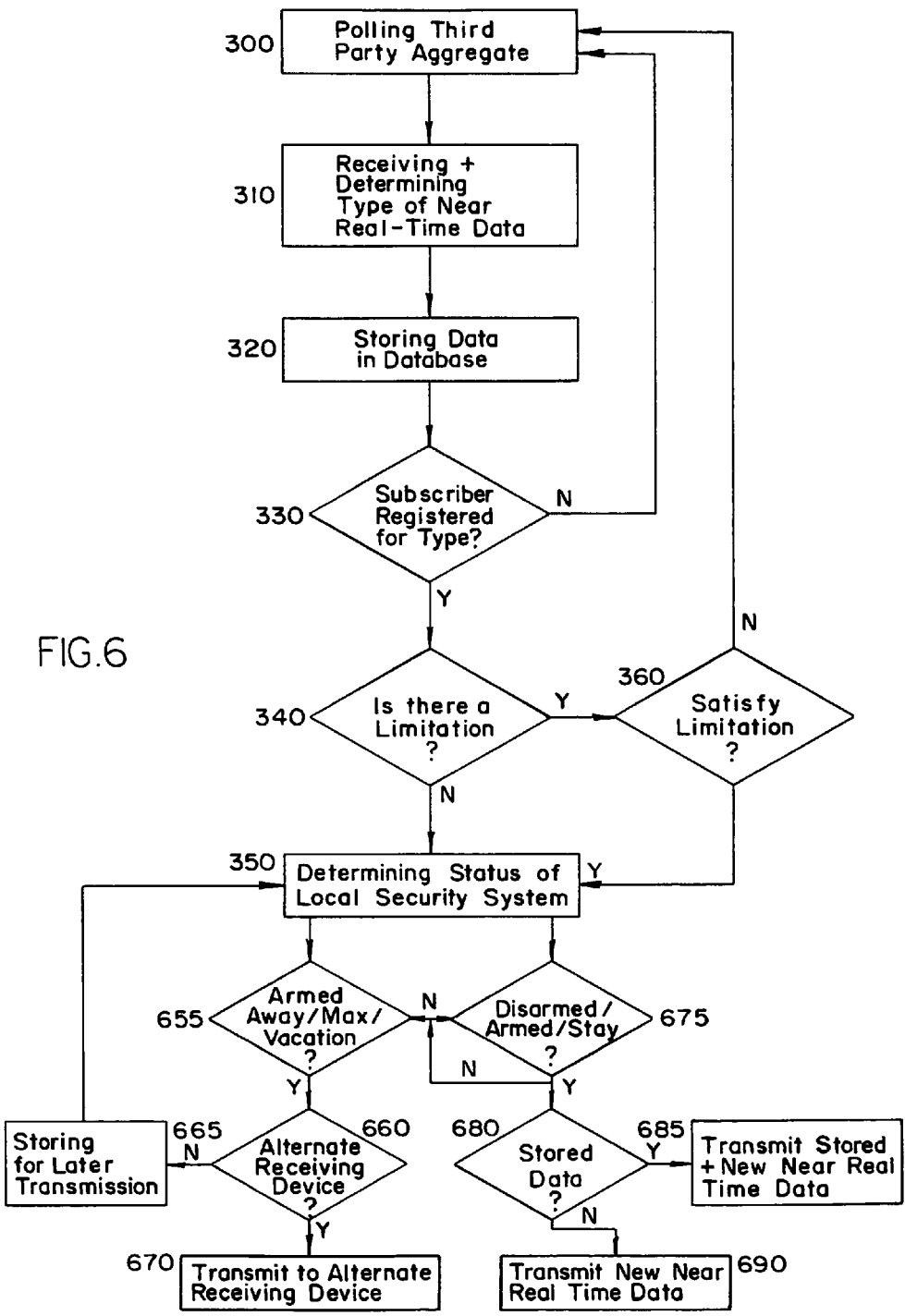
FIG. 6 illustrates a flow chart for the method of providing near real-time data according to a second embodiment of the invention.

FIG. 6 illustrates the method of displaying the near real-time data according to the above embodiment of the invention. Steps 300-340 and 360 are the same as the first embodiment of the invention and thus will not be described again. After steps 340 and 360 and prior to any transmission the NOC 110 will determine the status of the local security system 120 using information contained in periodic subscriber reports from the control panel 500, at step 650. The subscriber reports will indicate whether the local security system is armed, arm-stay, arm-away, disarmed, maximum security or armed-vacation. If the results of the determination is either armed-away, armed-vacation, or maximum (Step 655), the process moves to step 660. The NOC 110 will determine if the subscriber has preset an alternative receiving device as an alternate receiver. The alternate receiver can be any remote device capable of receiving text, or graphic information, such as but not limited to a personal computer cellular telephone pager, or PDA. The subscriber can set one or more alternate receiving devices during the registration process using the web server 125. Information regarding the alternate receiving device will be stored in the central database 210 indexed by subscriber record. The information includes any type of device contact identifier, e.g. telephone number, email address, and format for update, e.g. text or graphic.

If there are no alternate receiving devices preset, the near real-time data will be stored in the central database 210 indexed by subscriber record for uploading when the status for the security system changes to disarmed or armed-stay, at step 665. The process will return to step 650.

If there is at least one alternate-receiving device preset, the NOC 110 will format the near real-time data for each preset alternate receiving device and transmit the near real-time data to each preset alternate receiving device at step 670.

The transmission can be performed according to one of the methods described in U.S. Pat. No. 7,042,350 assigned to Honeywell International, Inc. which is hereby incorporated by reference.

If the status of the local security system is either disarmed or armed-stay (step 675), the NOC 110 will determine if there are any stored near real-time data associated with the subscriber record, at step 680. If there are any stored near real-time data, the NOC 110 will transmit both the new near real-time data along with the stored near real-time data to the local security system 120, step 685.

If there are no stored near real-time data, the NOC 110 will only transmit the new near real-time data to the local security system 120, at step 690. The near real-time data will be displayed on the keypad 540 of the local security system 120 in the same manner as described in FIG. 4.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of uploading near real-time data to a security system comprising the steps of:

a. Receiving the near real-time data from at least one third party source;
   b. Storing the near real-time data in a message database for a preset period of time in a location corresponding to the third party source from which the data is received;
   c. Determining at least one subscriber to send the near real-time data based upon at least one determination parameter provided by the subscriber;
   d. Determining an armed or disarmed status of the security system of the at least one subscriber;
   e. Transmitting said near real-time data to the security system corresponding to the at least one subscriber based upon the determined status; and
   f. Discarding the near real-time data from the message database after expiration of the preset period of time,
   wherein the preset period of time for each piece of near real-time data varies depending on at least one of a type of near real-time data and the third party source from which the piece of near real-time data is received.

2. The method according to claim 1, further comprising the step of
   g. Polling the at least one third party source for updates to the near real-time data.

3. The method according to claim 1, further comprising the step of converting the received near real-time data into a format compatible with the security system.

4. The method according to claim 1, wherein said near real-time data includes amber alerts.

5. The method according to claim 1, wherein said near real-time data includes weather alerts.

6. The method according to claim 1, wherein said at least one determination parameter is a location of the security system.

7. The method according to claim 6, wherein said location is a zip code.

8. The method according to claim 1, wherein said at least one determination parameter is a type of near real-time data.

9. The method according to claim 6, further comprising the step of determining if said security system is located within a preset limited location.

10. The method according to claim 1, further comprising displaying the near real-time data on at least one keypad located within a premises having the security system.

11. The method according to claim 1, where the step of transmitting said near real-time data to the security system, includes the sub-step of transmitting said real-time data to a control panel located within a premises having the security system, said control panel forwarding the near real-time data to at least one keypad.

12. The method according to claim 1, where the step of transmitting said near real-time data to the security system, includes the sub-step of transmitting said real-time data directly to at least on keypad located within a premises having the security system.

13. The method according to claim 10, further comprising notifying any occupant of a premises having the security system of a reception of said near real-time data.

14. The method according to claim 13, wherein said notifying includes an audible sound or voice indicating the reception of said near real-time data.

15. The method according to claim 13, wherein said notifying includes a visible indication of the reception of said near real-time data.

16. A method of displaying near real-time data on at least one keypad display of a security system comprising the steps of:

a. receiving the data from an external message database based upon an armed or disarmed status of the security system and upon the preferences of a user of the security system, storing the data for only a preset period of time and corresponding to a third party source from which the data is received;

b. determining whether the data is to be displayed based upon at least one display criterion;

c. formatting the data for displaying on the at least one keypad display in a format compatible with the at least one keypad display; and d. displaying the data in the format compatible with the at least one keypad display, wherein the preset period of time for each piece of data varies depending on at least one of a type of data and the third party source from which the piece of data is received.

17. The method according to claim 2, wherein the step of polling the at least one third party source occurs at a preset interval.

18. The method according to claim 17, wherein said preset interval is variable based on the type of data.

19. The method according to claim 17, wherein said preset interval is variable based on the at least one third party source.

20. The method according to claim 1, wherein the step of storing the near real-time data includes sorting the near real-time data based upon the at least one third party source.

21. The method according to claim 1, further comprising the step of:

inputting the at least one third party source into a database for polling.

22. The method according to claim 16, further comprising the step of: determining a status of a local security system that corresponds to said at least one keypad.

23. The method according to claim 22, wherein the displaying step is dependent upon the determination for the status of the local security system.

24. The method according to claim 21, wherein if the status of the local security system is armed-away, said data is stored in a database for display at a later time.

25. The method according to claim 24, wherein said later time is when said local security system is disarmed.

26. The method according to claim 24, wherein if the status of the local security system is armed-away, said data is transmitted to a registered' alternate remote device.

27. A communication system for automatically displaying near real-time data on a display of a security system keypad comprising:

a polling agent which actively collects the near real-time data from at least one third party source;

a message database for storing the near real-time data for only a preset period of time, the data indexed by the at least one third party source from which the data is received and by a type of near real-time data;

a control section for determining a location to send the near real-time data for displaying based upon preset parameters provided by a user of the security system;

a control section that determines an armed or disarmed status of the location;

a transmitter for transmitting the near real-time data to a security system keypad based upon the determination of location and status: and a display for displaying the near real-time data wherein the preset period of time for each piece of near real-time data varies depending on the type of near real-time data and the third party source from which the piece of near realtime data is received.

28. The communication system of claim 27, further comprising a central database for storing subscriber information which is used to determine a location to send the near real-time data.

29. The communication system of claim 27, wherein said control section is located at a network operation center.

30. The communication system of claim 27, wherein the control section is located at the security system.

31. The communication system of claim 30, wherein the present parameters are stored in a control panel at the security system.

\* \* \* \* \*